United States Patent [19]

Vogeley

[11] Patent Number: 5,153,621

[45] Date of Patent: Oct. 6, 1992

[54] OPTICAL SYSTEM FOR PROJECTING MULTIPLE IMAGES IN ADJOINING RELATION WITHOUT ILLUMINANCE DISCONTINUITIES

[75] Inventor: Arthur W. Vogeley, Yorktown, Va.

[73] Assignee: nView Corporation, Newport News, Va.

[21] Appl. No.: 785,921

[22] Filed: Oct. 31, 1991

[51] Int. Cl.⁵ .............................................. G03B 21/26
[52] U.S. Cl. ...................................... 353/30; 353/37; 353/82
[58] Field of Search ............... 353/30, 34, 37, 82, 353/83, 94, 98, 99, 102

[56] References Cited

U.S. PATENT DOCUMENTS

| | | | |
|---|---|---|---|
| 3,248,999 | 5/1966 | Wheeler | 353/31 |
| 3,440,956 | 4/1969 | Miller | 353/94 |
| 3,994,351 | 3/1976 | Ito et al. | 353/31 |
| 4,084,894 | 4/1978 | Yoshino | 353/34 |
| 4,114,037 | 9/1978 | Westwood | 353/30 |
| 4,150,396 | 4/1979 | Hareng et al. | 358/60 |
| 4,187,011 | 2/1980 | Di Matteo et al. | 353/30 |
| 4,458,993 | 7/1984 | Kempf | 353/94 |
| 4,552,441 | 11/1985 | Dewey | 353/31 |
| 4,737,843 | 4/1988 | Spencer | 358/66 |
| 4,763,993 | 8/1988 | Vogeley et al. | 350/331 |
| 4,917,465 | 4/1990 | Conner et al. | 350/335 |
| 4,944,578 | 7/1990 | Denison | 350/347 |
| 4,952,925 | 8/1990 | Haastert | 340/784 |
| 5,046,837 | 9/1991 | Stroomer et al. | 353/34 |

Primary Examiner—William A. Cuchlinski, Jr.
Assistant Examiner—William C. Dowling
Attorney, Agent, or Firm—Nixon & Vanderhye

[57] ABSTRACT

The optical system projects discrete images in adjoining relation on a view screen to form a single image with substantial no illuminance discontinuity at the juncture of the images. A pair of afocal lenses split the light rays from a source for passage through segments of the lenses and each discrete image display. The light rays from the image displays are returned to an optical axis through a projection lens such that the adjoining margins of the images on the view screen pass along the optical axis of the projection lens.

18 Claims, 3 Drawing Sheets

OPTICAL SYSTEM FOR PROJECTING MULTIPLE IMAGES IN ADJOINING RELATION WITHOUT ILLUMINANCE DISCONTINUITIES

BACKGROUND AND SUMMARY OF THE INVENTION

The present invention relates to a multiple image projection system for projecting two or more discrete images in adjoining relation on a view screen, and particularly relates to an optical system for projecting discrete multiple images in adjoining relation on a view screen to form a single seamless image thereon without substantial illuminance discontinuities at the juncture of the images. The present invention further relates to image projection displays of the liquid crystal display panel type, although the invention has applicability to other types of displays such as CRT projection systems. The invention is also not limited to either monochrome or color displays and embraces both rear projection and front projection installations.

In systems having a single light source illuminating a screen, the illumination on the screen at any point therealong is a function of the distance the screen lies from the light source and the inclination of the screen surface relative to the light source. In single image projection systems, the human eye is quite tolerant of illumination changes occurring over the surface of a screen and, thus, projector condenser lens systems having an acceptance cone angle of approximately 90° are quite common. A discontinuity in illuminance, for example, when it is desired to project multiple images, however, is considerably less tolerable. An illuminance discontinuity of less than 5% is readily observable and undesirable. The cause of illuminance disparity when two or more images are projected and touch one another is a function, among other things, of the location of the observer. For example, if the observer is in front of a rear projection system using a pair of side-by-side projecting lenses to project two discrete images in side-by-side relation on a viewing screen, illuminance disparity does not occur if the observer views the screen from a point directly in front of the screen and equidistant from the projection lenses. When the observer, however, moves to one side or the other, the touching edges of the images become brighter or darker as a result of the different bend angles of the light rays emanating from the viewing screen from the different projection lenses.

There are other causes for this illuminance disparity which suggest other solutions, such as a low-gain screen. In general, however, such other solutions have not been effective to minimize or eliminate illuminance discontinuities at the juncture of multiple images in a projection system.

According to the present invention, the optical paths of the two or more images to be projected are combined to form a larger, single image displayed on a view screen by a novel and improved condenser and projection lens system without substantial illuminance discontinuity or a seam between the two projected images. Whereas previous systems for matching separate images at joining edges along a view screen employed separate projection lenses wherein the images were joined along opposite edges that did not pass through optical axes, the present invention provides for the juncture of the two images to pass through a single optical axis at the projection lens so that no mismatch or distortion occurs and illuminance discontinuity is substantially precluded.

In a preferred embodiment of the present invention, a pair of discrete images are disposed in adjoining relation on a view screen to form a single image thereon with minimal or no illuminance discontinuity at their juncture. To accomplish this, there is provided a light source, a condensing lens, a mirror system, a pair of discrete image displays, and a projection lens. The image displays may be LCD crystals or any other type of conventional image displays. An optical system including a lens and mirror is employed for transmitting the light rays from the light source separately through each of the image displays. That is, the lens and mirror project light rays from the source along discrete optical paths for passage separately through each image display. A single projection lens defining an optical axis is provided for projecting the images in adjoining relation on a view screen. Interposed between the image displays and the projection lens is an optical system including a lens and mirror for combining the light rays passing through the image displays along discrete optical paths for passage through the projection lens such that a single image combining the images from the discrete image displays in substantially seamless adjoining relation is formed on the view screen.

More particularly, the optical system between the image displays and the projection lens projects the light rays passing through each display for passage through the projection lens such that the light rays forming the adjoining edges of the discrete images on the view screen pass along the optical axis of the projection lens, whereby a single, substantially-seamless image is formed on the view screen.

A particular advantage of the present invention resides in the ability to physically join optically what cannot practically be physically joined in a mechanical sense. That is, because of construction methods, mounting circuitry, etc., liquid crystal panels, CRTs and the like cannot generally be physically joined to make a single, larger object. The present invention effects that image jointure optically.

More particularly, the optical system of the present invention is preferably comprised of an afocal pair of lenses. These lenses produce collimated light between them enabling their separation distances to be changed without affecting the optical characteristics of the system. Fresnel lenses could be used if desired. In the present system, the afocal lenses, in combination with mirrors or other lenses, allow part of the optical path to be diverted to one side, allowing separate transparent image displays, such as LCDs with interfering borders, to be optically combined in such manner that the borders do not appear in the image or interfere with the juncture of the images.

In a further embodiment of the present invention, additional image displays can be combined to form a single image on a viewing screen without illuminance discontinuities. For example, four image displays can be combined by using one quadrant of the illuminating light in the condenser lenses for each image display. In this case, four mirrors are required in each quadrant to form the optical paths through the lens system, and to divert the light rays from the image displays through the optical axis of the projection lens. Thus, four side-by-side images can be displayed as a single combined image on a viewing screen without substantial illuminance discontinuities.

In a preferred embodiment according to the present invention, there is provided an optical system for simultaneously projecting discrete images in adjoining relation on a view screen to form a single image therein with minimal illuminance discontinuities at their juncture, comprising a light source, at least a pair of discrete image displays, a lens system for projecting light rays from the source for passage separately through each image display, a projection lens for projecting an image on the view screen and defining an optical axis and means for projecting the light rays passing through each display for passage through the projection lens such that light rays forming the adjoining edges of the discrete images on the view screen pass along the optical axis of the projection lens, whereby a single image is formed on the view screen.

In a further preferred embodiment according to the present invention, there is provided an optical system for simultaneously projecting discrete images in adjoining relation on a view screen to form a single image thereon with minimal illuminance discontinuities at their juncture, comprising a light source, a pair of discrete image displays, a lens system for projecting light rays from the source along discrete optical paths for passage separately through each image display and a projecting lens for projecting an image on the view screen. Means are provided for combining the light rays passing through the image displays along the discrete optical paths for passage through the projection lens such that a single image combining the images from the discrete image displays in substantially seamless adjoining relation is formed on said view screen.

In a further preferred embodiment according to the present invention, there is provided an optical system for simultaneously projecting more than a pair of discrete images in adjoining relation on a view screen to form a single image thereon with minimal illuminance discontinuities at their juncture, comprising a light source, more than a pair of discrete image displays, a lens system for projecting light rays from the source along discrete optical paths for passage separately through each image display and a projecting lens for projecting an image on the view screen. Means are provided for combining the light rays passing through the image displays along the discrete optical paths for passage through the projection lens such that a single image combining the images from the discrete image displays in substantially seamless adjoining relation is formed on the view screen.

Accordingly, it is a primary object of the present invention to provide a novel and improved optical system for simultaneously projecting discrete images in adjoining relation on a view screen to form a single image substantially without illuminance discontinuities at their juncture.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
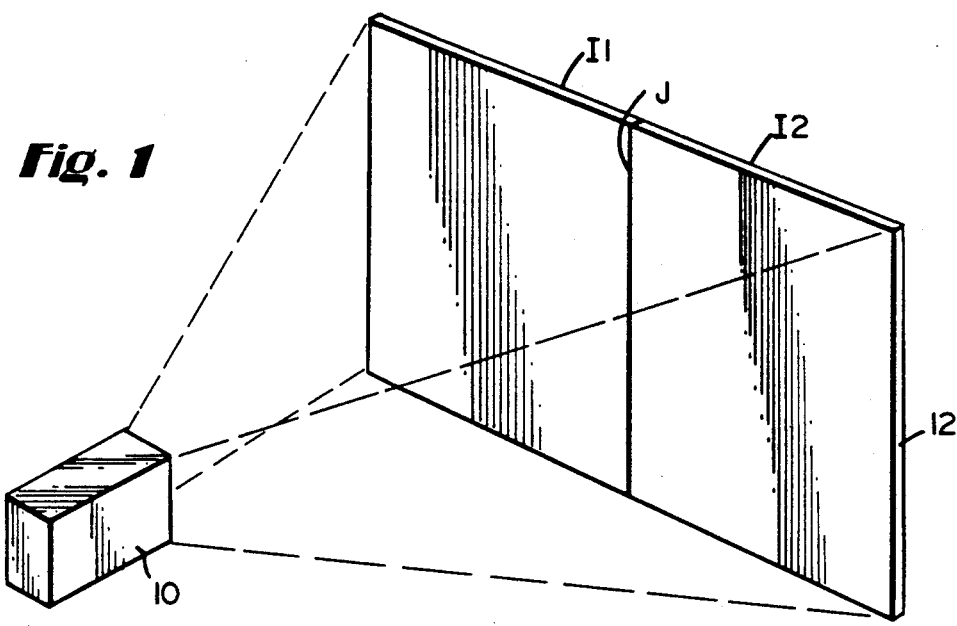
FIG. 1 is a perspective view of an optical system constructed in accordance with the present invention illustrating the projection of a pair of discrete images in side-by-side relation on a view screen.

Referring now to the drawings, particularly, to FIG. 1, there is illustrated an optical system according to the present invention including a projection system within a housing 10 for projecting images on a view screen 12. As illustrated, a pair of images I1 and I2 are projected on screen 12 in side-by-side relation one to the other. The juncture of the images is illustrated at J. While the images I1 and I2 are illustrated in side-by-side relation with the juncture J extending in a vertical direction, it will be appreciated that the images I1 and I2 may be superposed one over the other with the juncture between the images extending in a horizontal direction. Other orientations of the images I1 and I2 are possible.

The projection system 10 according to the present invention forms the images I1 and I2 such that the juncture J has minimal or no illuminance discontinuities. In this manner, the viewing eye will discern essentially a single image comprising the combined images I1 and I2 with high resolution with little or not illuminance disparity between the images along the juncture.

Figure 2:
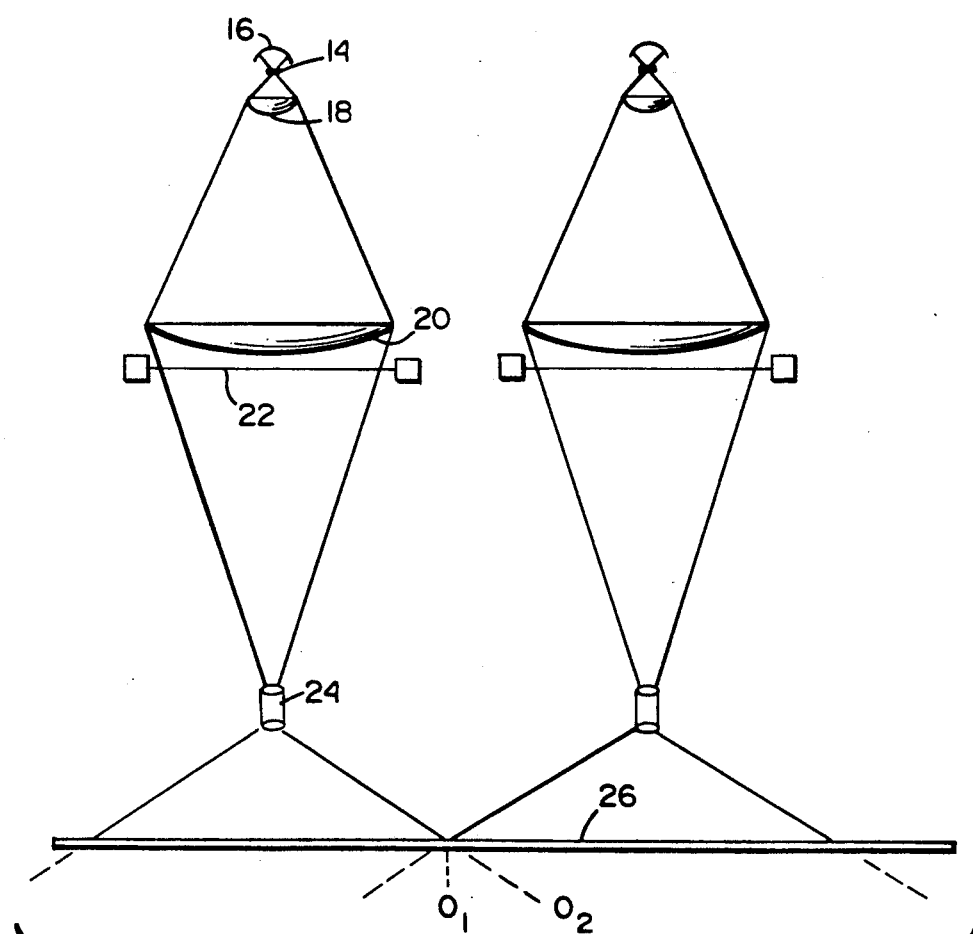
FIG. 2 is a schematic illustration of an optical projection system according to the prior art.

Referring now to FIG. 2, there is illustrated a prior art system which is a single image projection system employing a pair of discrete side-by-side projection systems. Particularly, each projection system of the illustrated prior art system includes a light source 14, a spherical mirror 16 for concentrating the light rays for direction through a condenser lens 18 and a second condenser lens 20. The light rays are directed through an image display 22 for projection of the image through a projection lens 24 for display on viewing screen 26. Each illustrated prior art projection system is paired with another duplicate projection system such that the adjoining edge of the images projected thereby lie along a juncture on the view screen 26.

As previously observed, an observer O1 directly in front of the viewing screen in line with the juncture of the two images observes no illuminance disparity between the projected images. However, all other observers, for example, observer O2, sees a substantial difference in the brightness and darkness of the edges of the images at their junction, hence, a substantial illuminance disparity. Accordingly, it is this disparity which the present invention substantially eliminates.

Figure 3:
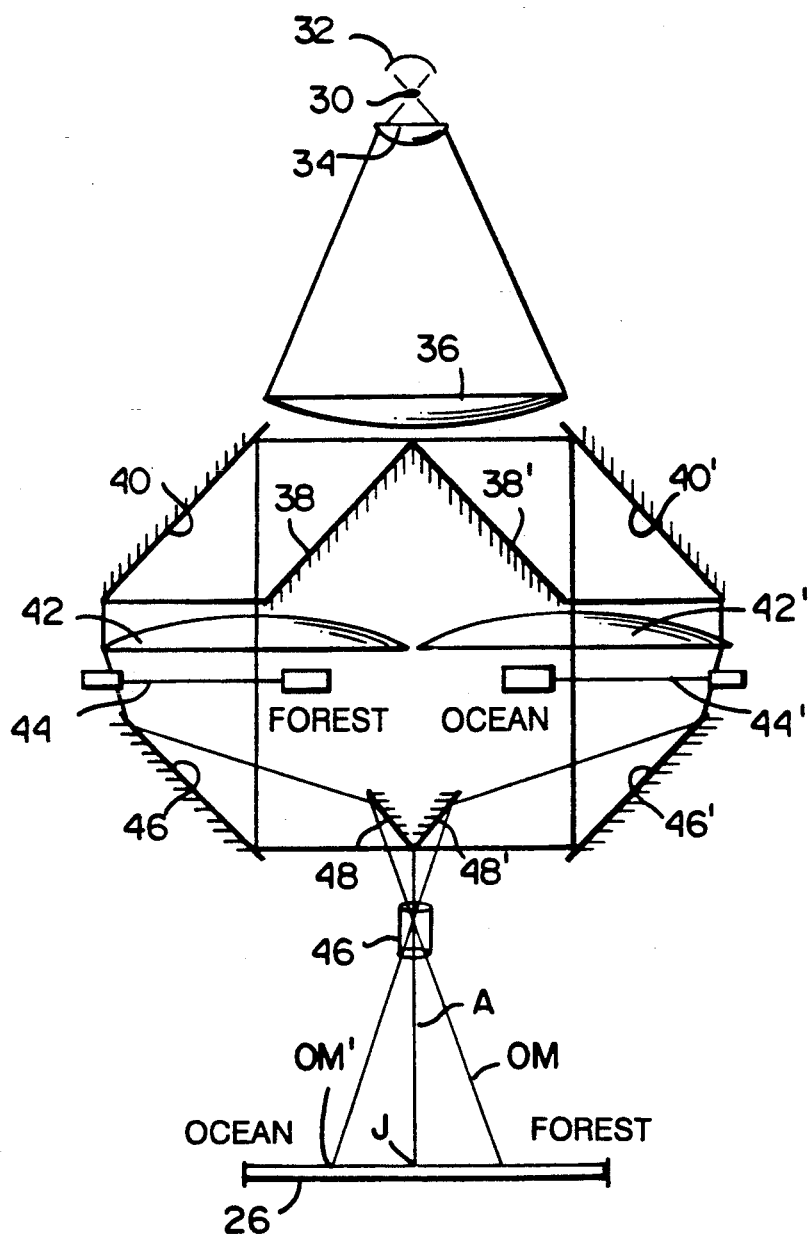
FIG. 3 is a schematic illustration of an optical system according to the present invention.

Referring now to the present invention illustrated in FIG. 3, the illuminance disparity is substantially minimized or eliminated by using the novel and improved optical projection system hereof. Particularly, the optical projection system hereof includes a light source 30, a spherical mirror 32 for concentrating the light rays, and a condenser lens 34 for directing the light rays to the first lens 36 of paired afocal lenses 36 and 42. Considering first the left-hand portion of drawing FIG. 3, the light rays through the left-half of the first lens 36 are directed against a first flat mirror 38, then a parallel second flat mirror 40 for directing the collimated light through a second lens 42 of the pair of afocal lenses. It will be appreciated that the light rays passing, for example, through one-half of the first lens 36 are directed through one-half of the second lens 42. An image display 44 is disposed along the optical path for receiving the light rays passing through the portions or segments of the paired afocal lens 36 and 42. The light rays passing through the segment of lens 42 are focused by that lens for entry into the single projection lens 46. Importantly, the light rays from the lens 42 passing through image display 44 are directed by flat mirror 46 and 48 for entry through projection lens 46 in such manner that the inner margin of image display 44 lies along the optical axis A of projection lens 46, while the light rays passing through the outer margin of image display 44 are denoted by the letters OM.

The opposite or right-hand portion of the optical system illustrated in FIG. 3 is the mirror image of the left-hand portion described above. Particularly, light rays from source 30 pass through the other segment or portion of lens 36 for passage through a portion of a second lens 42' by means of flat mirrors 38' and 40'. The light rays passing through the segment of lens 42' also pass through discrete image display 44' and are focused for passing through the single projection lens 46. Mirrors 46' and 48' return the optical path to projection lens 46. Thus, it will be appreciated that the light rays passing through the inner margin of image display 44' lie along the optical axis A of the projection lens 46, while those passing through the outer margin of image display 44' are designated OM'.

With the optical system as thus described, the outer margins of the image displays 44 and 44' lie along the juncture J on the view screen 26, but with minimal or no illuminance disparity at their juncture. That is, the images at their juncture blend with one another without discernible disparity in illuminance.

Figure 4:
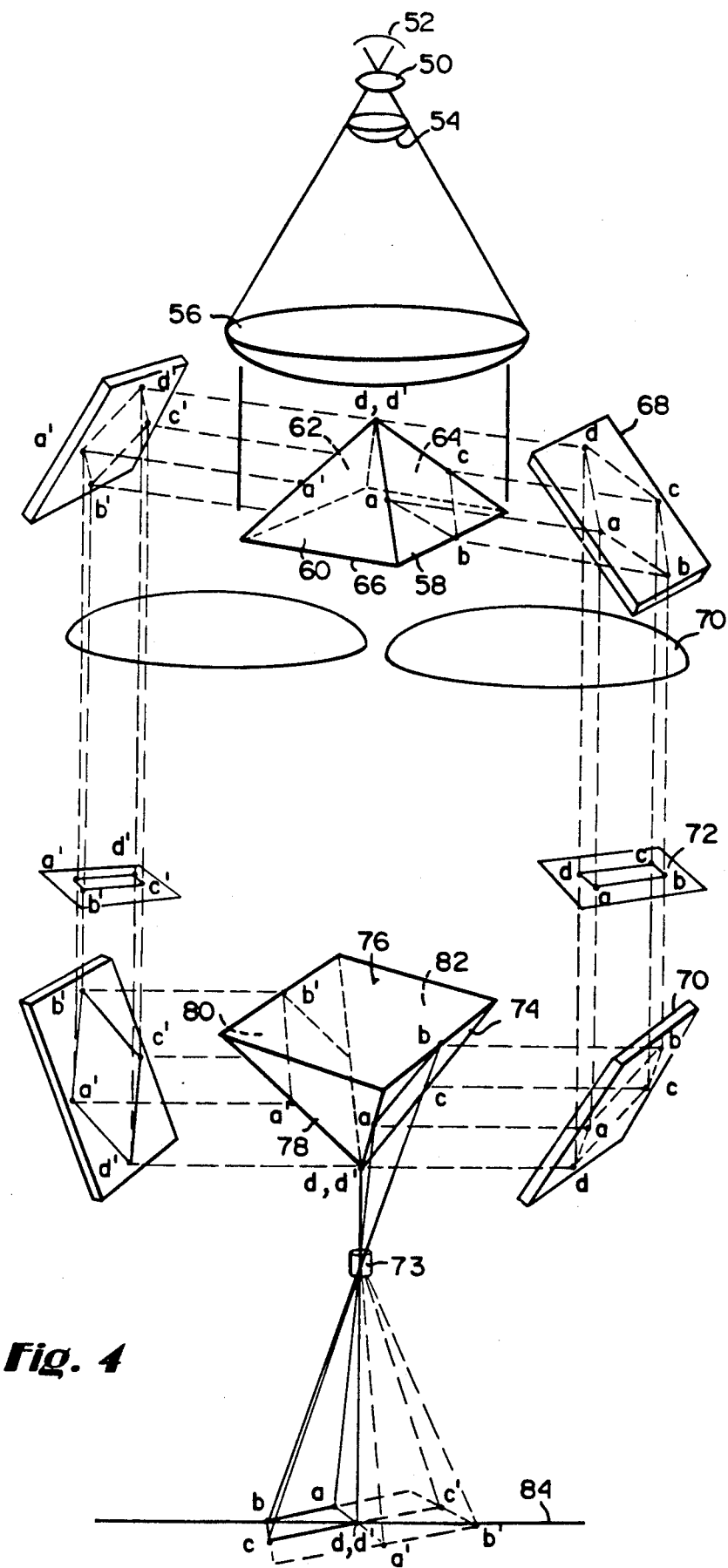
FIG. 4 is a schematic illustration of an optical system for displaying four discrete images in side-by-side relation according to another embodiment hereof.

Referring now to FIG. 4, there is illustrated an image projection system according to a further embodiment of the present invention wherein four discrete images are projected onto a viewing screen, with substantially no illuminance disparity at the adjoining edges of the images. The projecting system illustrated in FIG. 4 includes a light source 50, a spherical mirror 52 for concentrating the light rays, and a condensor lens 54 for directing the light rays to the first lens 56. Lens 56 directs light rays against the four flat mirrored surfaces 58, 60, 62 and 64 of an upright pyramidally-shaped structure 66 supporting the mirrored surfaces. The light rays are reflected from each of the mirrored surfaces 58, 60, 62 and 64 onto a mirror and lens system identical one to the other in each of the four quadrants. Only one of the mirror and lens system in a single quadrant will be described, it being appreciated that each of the other three mirror and lens systems in their associated quadrants is identical to the system to be described. Also, it will be appreciated that FIG. 4 illustrates two of the mirror and lens systems in opposite quadrants and that an additional pair of mirror and lens systems to be described lie in the other two quadrants opposite surfaces 60 and 64, respectively.

The mirror and lens system in this embodiment include a first flat mirror 68 disposed parallel to the reflecting mirror 58 formed on the pyramid structure 66. The collimated light reflected from mirror 58 onto mirror 68 is passed through a quadrant of a second lens 69 forming part of the paired afocal lens 56 and 69. It will be appreciated that the lens. 69 may comprise a single-layer lens with the light from the four mirrored surfaces passing through associated quadrants of the single lens. An image display 72 is disposed along the optical path for receiving the light rays passing through the portions or segments of the paired afocal lenses 56 and 69. The light rays passing through image display 72 are focussed for entry into a single projection lens 73. More particularly, the light rays from lens 69 pass through the image display 72 and are directed by the flat mirror 70 for reflection onto one of the mirrored surfaces 74 of a plurality of mirrored surfaces 74, 78, 80 and 82 formed on the surface of an inverted pyramidal structure 76. Thus, the pyramidal structure 76 has mirrors arranged similarly as pyramidal structure 66, but downwardly directed. Thus, the light rays passing through image display 72 are reflected by mirrors 70 and 74 and pass through the focussing lens 73 for display on a viewing screen 84.

The dotted and full-line rectilinear outlines on each of the four illustrated mirrored surfaces 68, 70, 68' and 70' represent the portions of the light useful for projecting the images onto the viewing screen 84. Because of the pyramidal-shaped surfaces for splitting the collimated light, the image display 72 is rotated in a plane parallel to the base of the pyramidal structure 66 45° to maximize the area of the surface useful for transmitting the light. As illustrated, the corners of the rectilinear image display 72 are designated a, b, c and d and the light rays passing through those corners are traced on the drawing with corresponding designations. Thus, it will be appreciated that the rectilinear areas defined by the dotted lines on the pyramidal structure 66 and mirror 68 represent the area of useful light transmitted through the image display 72. The actual image defined at a, b, c and d is projected onto mirrors 70 and 74 for projection through lens 73. The corresponding corners of the image of image display 72 are also illustrated on the viewing screen by the letters a, b, c and d. Similarly, the corresponding corners of the image of image display 70' are also illustrated on the viewing screen by the designations a', b', c' and d'.

With this arrangement, it will be appreciated that each of the four mirror and lens systems projects the image associated with each system onto the mirrored surfaces associated with the lower pyramid structure 76 for projection by projection lens 73 onto the viewing surface 84. Thus, the various images from the four quadrants project the images in a series of rectilinear images in side-by-side relation one to the other to form a single image with minimal illuminance discontinuities at their junctures.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An optical system for simultaneously projection discrete images in adjoining relation on a view screen to form a single image therein with minimal illuminance discontinuities at their juncture, comprising:
   a light source;
   at least a pair of discrete image displays;
   a lens system for projecting light rays from said source for passage separately through each image display;

a projection lens for projecting an image on the view screen and defining an optical axis; and means for projecting the light rays passing through each display for passing through said projection lens such that light rays forming the adjoining edges of the discrete images on the view screen pass along the optical axis of said projection lens, whereby a single image is formed on the view screen.

2. An optical system according to claim 1 wherein said lens system includes first, second and third lenses, first means for diverting a portion of the light rays from the light source passing through said first lens for passage through a portion of said second lens and a first of said pair of image displays, and second means for diverting another portion of the light rays from the light source passing through said first lens for passage through a portion of said third lens and a second of said pair of image displays.

3. An optical system according to claim 2 wherein said first and second lens and said first and third lens form afocal lens pairs thereof.

4. An optical system according to claim 2 wherein said first and second lens and said first and third lens comprise Fresnel lenses.

5. An optical system according to claim 2 wherein said first and second means for diverting said portions of the light rays include mirrors.

6. An optical system according to claim 1 wherein said projection means includes mirrors disposed in the path of the light rays between each display and said projection lens.

7. An optical system according to claim 1 wherein the discrete images on the view screen are side-by-side relative to one another with their juncture extending substantially in a vertical direction.

8. An optical system according to claim 1 wherein the discrete images on the view screen are above and below one another with their junctures extending substantially horizontally.

9. An optical system for simultaneously projecting discrete images in adjoining relation on a view screen to form a single image thereon with minimal illuminance discontinuities at their juncture, comprising:
   a light source;
   a pair of discrete image displays;
   a lens system for projecting light rays from said source along discrete optical paths for passage separately through each image display;
   a projecting lens for projecting an image on the view screen; and
   means for combining the light rays passing through the image displays along said discrete optical paths for passage through said projection lens such that a single image combining the images from the discrete image displays in substantially seamless adjoining relation is formed on said view screen.

10. An optical system according to claim 9 wherein said lens system includes first, second and third lenses, first means for diverting a portion of the light rays from the light source passing through said first lens for passage through a portion of said second lens and a first of said pair of image displays, and second means for diverting another portion of the light rays from the light source passing through said first lens for passage through a portion of said third lens and a second of said pair of image displays.

11. An optical system according to claim 10 wherein said first and second lens and said first and third lens form afocal lens pairs thereof.

12. An optical system according to claim 10 wherein said first and second means for diverting said portions of the light rays include mirrors.

13. An optical system according to claim 9 wherein said projection means includes mirrors disposed in the path of the light rays between each display and said projection lens.

14. An optical system for simultaneously projecting more than a pair of discrete images in adjoining relation on a view screen to form a single image thereon with minimal illuminance discontinuities at their juncture, comprising:
   a light source;
   more than a pair of discrete image displays;
   a lens system for projecting light rays from said source along discrete optical paths for passage separately through each image display;
   a projecting lens for projecting an image on the view screen; and
   means for combining the light rays passing through the image displays along said discrete optical paths for passage through said projection lens such that a single image combining the images from the discrete image displays in substantially seamless adjoining relation is formed on said view screen.

15. An optical system according to claim 14 including four discrete image rectilinear displays, said combining means combining the light rays passing through the image displays for passage through said projection lens such that the images of said image displays form a single rectilinear display with the image from each display forming a quadrant of said single rectilinear display.

16. An optical system according to claim 14 including four discrete image displays, said lens system including four mirrored surfaces forming generally the sides of a pyramid with the apex of the pyramid facing said light source.

17. An optical system according to claim 14 including four discrete image displays, said combining means including four mirror surfaces forming generally the sides of a pyramid with the apex of the pyramid facing said view screen.

18. An optical system according to claim 16 wherein said combining means includes four mirrored surfaces forming generally the sides of a pyramid with the apex of the pyramid facing said view screen.

* * * * *